US006279111B1

(12) United States Patent
Jensenworth et al.

(10) Patent No.: US 6,279,111 B1
(45) Date of Patent: Aug. 21, 2001

(54) SECURITY MODEL USING RESTRICTED TOKENS

(75) Inventors: Gregory Jensenworth, Redmond; Praerit Garg, Kirkland; Michael M. Swift, Seattle; Mario C. Goertzel, Kirkland; Shannon J. Chan, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/096,926

(22) Filed: Jun. 12, 1998

(51) Int. Cl.$^7$ .................................................. G06F 12/14

(52) U.S. Cl. .......................... 713/200; 713/159; 713/172

(58) Field of Search .................................. 713/193, 185, 713/165, 172, 200, 201, 159

(56) References Cited

U.S. PATENT DOCUMENTS

| 4,962,449 | 10/1990 | Schlesinger . |
| 5,138,712 | 8/1992 | Corbin . |
| 5,276,901 | 1/1994 | Howell et al. . |

(List continued on next page.)

FOREIGN PATENT DOCUMENTS

| 0 398 645 | 11/1990 | (EP) . |
| 0 465 016 | 1/1992 | (EP) . |
| 0 588 415 | 3/1994 | (EP) . |
| 0 697 662 | 2/1996 | (EP) . |
| 0 813 133 | 12/1997 | (EP) . |
| WO 96/05549 | 2/1996 | (WO) . |
| WO 96/13113 | 5/1996 | (WO) . |
| WO 97/15008 | 4/1997 | (WO) . |
| WO 97/26734 | 7/1997 | (WO) . |

OTHER PUBLICATIONS

"Java Security Model: Java Protection Domains," http://java.sun.com/security/handout.html, printed Nov. 11, 1999.
Anon, "Privilege Control Mechanism for UNIX Systems," *IBM Technical Disclosure Bulletin*, vol. 34, No. 7b pp. 477–479, Dec. 1991.
Erdos et al., "Security Reference Model for the Java Developer's Kit 1.0.2," *Java Security Reference Model*, Nov. 13, 1996, http://www.javasoft.com/security/SRM.html printed Jul. 14, 1999.

(List continued on next page.)

*Primary Examiner*—James P. Trammell
*Assistant Examiner*—Pierre Eddy Elisca
(74) *Attorney, Agent, or Firm*—Michalik & Wylie, PLLC

(57) ABSTRACT

A restricted access token is created from an existing token, and provides less access than that token. A restricted token may be created by changing an attribute of one or more security identifiers allowing access in the parent token to a setting that denies access in the restricted token and/or removing one or more privileges from the restricted token relative to the parent token. A restricted access token also may be created by adding restricted security identifiers thereto. Once created, a process associates another process with the restricted token to launch the other process in a restricted context that is a subset of its own rights and privileges. A kernel-mode security mechanism determines whether the restricted process has access to a resource by first comparing user-based security identifiers in the restricted token and the intended type of action against a list of identifiers and actions associated with the resource. If no restricted security identifiers are in the restricted token, access is determined by this first check, otherwise a second access check further compares the restricted security identifiers against the list of identifiers and actions associated with the resource. With a token having restricted security identifiers, the process is granted access if both the first and second access checks pass. In this manner, a process is capable of restricting another process, such as possibly unruly code, in the actions it can perform.

38 Claims, 12 Drawing Sheets

U.S. PATENT DOCUMENTS

| | | |
|---|---|---|
| 5,321,841 | 6/1994 | East et al. . |
| 5,390,247 | 2/1995 | Fischer . |
| 5,412,717 | 5/1995 | Fischer . |
| 5,506,961 | 4/1996 | Carlson et al. . |
| 5,542,046 | 7/1996 | Carlson et al. . |
| 5,638,448 | 6/1997 | Nguyen . |
| 5,649,099 | 7/1997 | Theimer et al. . |
| 5,675,782 | 10/1997 | Montague et al. . |
| 5,678,041 | 10/1997 | Baker et al. . |
| 5,680,461 * | 10/1997 | McManis ............................... 380/25 |
| 5,682,478 * | 10/1997 | Watson et al. ....................... 713/202 |
| 5,745,676 | 4/1998 | Hobson et al. . |
| 5,757,916 | 5/1998 | MacDoran et al. . |
| 5,761,669 | 6/1998 | Montague et al. . |
| 5,812,784 * | 9/1998 | Watson et al. ....................... 713/201 |
| 5,826,029 | 10/1998 | Gore et al. . |
| 5,845,067 * | 12/1998 | Porter et al. ......................... 713/201 |
| 5,922,073 | 7/1999 | Shimada . |
| 5,925,109 | 7/1999 | Bartz . |
| 5,940,591 | 8/1999 | Boyle . |
| 5,941,947 | 8/1999 | Brown et al. . |
| 5,949,882 | 9/1999 | Angelo . |
| 5,983,270 | 11/1999 | Abraham et al. . |
| 5,983,350 | 11/1999 | Minear et al. . |
| 6,081,807 | 6/2000 | Story et al. . |
| 6,105,132 | 8/2000 | Fritch et al. . |

OTHER PUBLICATIONS

Fritzinger et al., "Java Security," 1996, http://java.sun.com/security/whitepaper/txt.

Fritzinger et al., "Java Security," 1996, http://java.sun.com/security/whitepaper/ps.

Goldberg et al., "A Secure Environment for Untrusted Helper Applications: Confining the Wily Hacker," *Sixt USENIX Security Symposium,* Jul. 22–25, 1996, http://www.usenix.org/publications/library/proceedings/sec9.

Goldstein, Ted, "The Gateway Security Model in the Java Commerce Client," *The Source for Java™ Technology,* 1997, http://www.java.sun.com/products/commerce/docs/whitepapers/security/JCC_gateway.html printed Jul. 14, 1999.

Mazieres, David and M. Frans Kaashoek, "Secure Applications Need Flexible Operating Systems," 6th Workshop on Hot Topics in Operating Systems(HotOs–VI), May 5–6, 1997, http://www.eecs.harvard.edu/hotos/.

Neuman et al., "Kerbros: An Authentication Service for Computer Networks," *IEEE Communications Magazine,* pp. 33–38, Sep. 1, 1994.

Copy of International Search Report in Corresponding PCT Application No. PCT/US99/13057.

Soshi et al., *The Saga Security System: A Security Architecture for Open Distributed Systems,* IEEE, pp. 53–58 (1997).

Anonymous, "Apache suEXEC Support," (describes the Apache HTTP Server Version 1.3 dating from Jun. 5, 1998 as documented in Written Opinion for PCT Application No. PCT/US99/12912), http://www.apache.org/docs/suexec.html printed Jul. 24, 2000.

Anonymous, "Apache Virtual Host documentation," (describes the Apache HTTP Server Version 1.3 dating fr Jun. 5, 1998 as documented in Written Opinion for PCT Application No. PCT/US99/12912), http://www.apache.org/docs/vhosts/index.html, printed Jul. 24, 2000.

Bell Telephone Laboratories Incorporated, *UNIX™ Time–Sharing System: UNIX Programmer's Manual,* $7^{th}$ Edition, vol. 1, CHMOD(1), SU(1), EXEC(2) (Jan. 1979).

\* cited by examiner

SECURITY MODEL USING RESTRICTED TOKENS

FIELD OF THE INVENTION

The invention relates generally to computer systems, and more particularly to an improved security model for computer systems.

BACKGROUND OF THE INVENTION

Historically, executable content could only installed on a computer system by physically bringing magnetic media to the computer and having someone with administrative privileges install it. At present, however, the Internet has made it very easy and popular for ordinary computer users to download executable content such as ActiveX controls, programs, and scripts. In many cases, executable content may be downloaded and executed via the Internet without the user even realizing that such an event took place.

Unfortunately, such executable content is often unruly, e.g., it may be malicious and intentionally destroy data on the client machine, error-prone and cause the client machine to crash, or well-intentioned but careless and divulge confidential information about the client. Although these types of computer problems have previously existed in the form of "viruses" and "trojans," the ubiquitous presence of World Wide Web has made these problems widespread, and in some cases out of control. In general, client operating environments are not adequately protected against unruly code.

Some operating systems already have an existing security mechanism that limits what non-privileged users may do. For example, the security system built into the Windows NT operating system controls access to resources based on the identities of users. When a Windows NT process wishes to access a resource to perform some action, the security mechanism in Windows NT compares a client's user and group IDs and privileges associated with that process against security information assigned to that resource to grant or deny access to the resource. In this manner, unauthorized users are prevented from accessing resources and potentially causing harm, while authorized users may be limited in the actions they are allowed to perform.

However, at present, when a user process has the appropriate rights or privileges to access a resource, the process, which may include executable content that is unruly, may access the resource with undesirable results. For example, a Windows NT user having appropriate credentials may download and execute unruly code, whereby any or all of the above-described adverse consequences may result. Other security models have similar and other drawbacks that make them vulnerable to the same problems.

SUMMARY OF THE INVENTION

Briefly, the present invention provides restricted access tokens, each of which are a modified, restricted version of an access token created from an existing (parent) token. A restricted token has less access than the parent token from which it is copied, and may be created by changing an attribute of one or more security identifiers that allow access in the parent token to a setting that disables access for allow in the restricted token, and/or removing one or more privileges from the restricted token that are present in the parent token. In addition, a restricted token may also be created by placing restricted security identifiers therein.

In use, a process is associated with a restricted token, such as by an application that launches that process. When the restricted process attempts to perform an action on a resource, a kernel mode security mechanism first compares the user-based security identifiers and the intended type of action against a list of identifiers and actions associated with the resource. If there are no restricted security identifiers in the restricted token, access is determined by the result of this first comparison. If there are restricted security identifiers in the restricted token, a second access check for this action compares the restricted security identifiers against the list of identifiers and actions associated with the resource. With a token having restricted security identifiers, the process is granted access to the resource only if both the first and second access checks pass.

By creating a restricted token, a process can launch another process in a restricted context that is a subset of its own rights and privileges. In this manner, a process is capable of restricting another process, such as possibly unruly code, in the actions it can perform to resources.

Other advantages will become apparent from the following detailed description when taken in conjunction with the drawings, in which:

DETAILED DESCRIPTION

Exemplary Operating Environment

Figure 1:
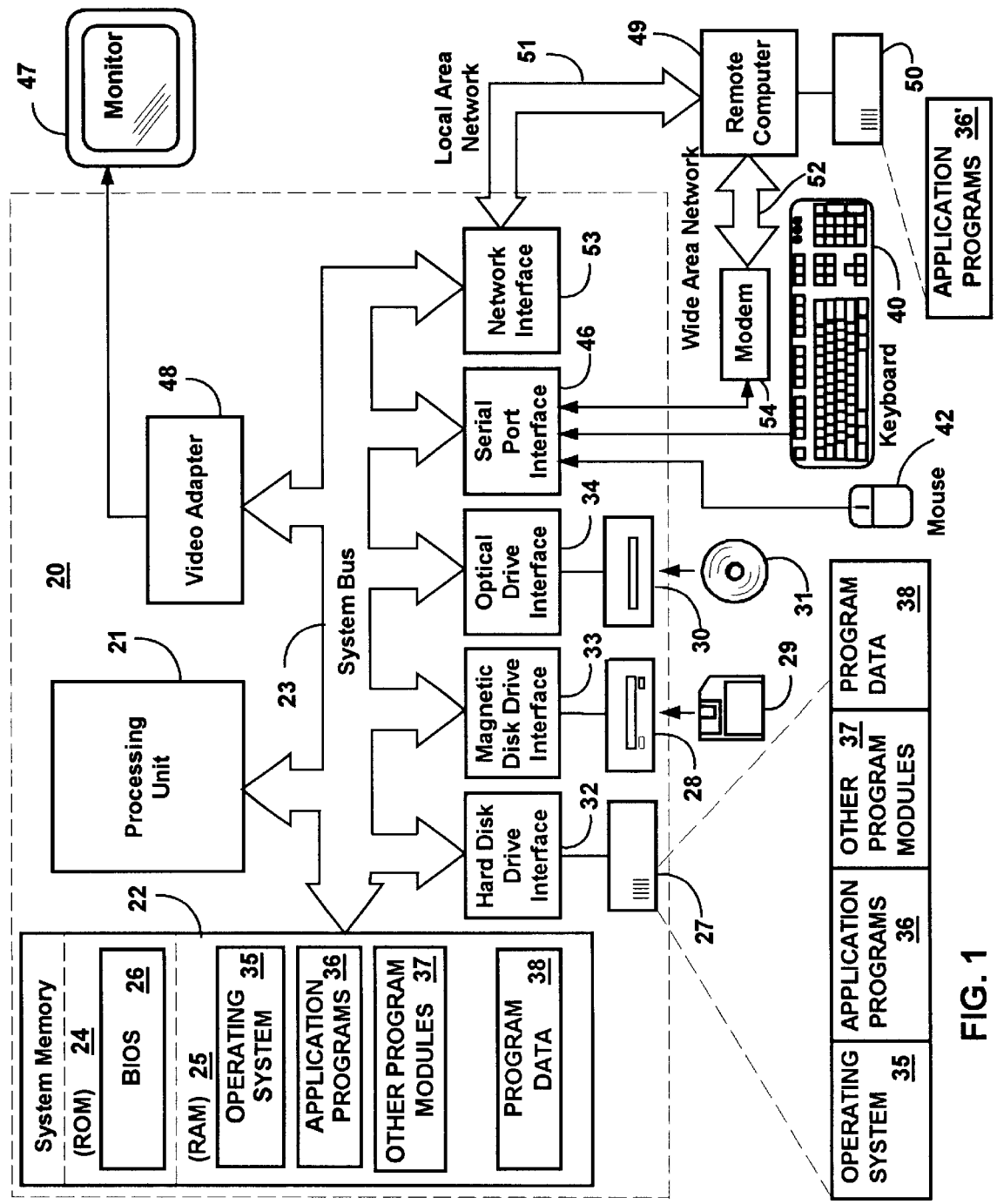
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The General Security Model

The preferred security model of the present invention is described herein with reference to the Windows NT security model. Notwithstanding, there is no intention to limit the present invention to the Windows NT operating system, but on the contrary, the present invention is intended to operate with and provide benefits with any mechanism that performs security checks at the operating system level. In addition, the present invention may also be used with software-fault isolation on a per-thread basis, or with a virtual machine where restrictions are determined from the stack of classes currently executing. Moreover, the present invention does not necessarily depend on kernel-mode operation, as with software-fault isolation or a virtual machine it may be implemented in user-mode.

In general, in the Windows NT operating system, a user performs tasks by accessing the system's resources via processes (and their threads). For purposes of simplicity herein, a process and its threads will be considered conceptually equivalent, and will thus hereinafter simply be referred to as a process. Also, the system's resources, including files, shared memory and physical devices, which in Windows NT are represented by objects, will be ordinarily referred to as either resources or objects herein.

When a user logs on to the Windows NT operating system and is authenticated, a security context is set up for that user, which includes building an access token 60. As shown in the left portion of FIG. 2, a conventional user-based access token 60 includes a UserAndGroups field 62 including a security identifier (Security ID, or SID) 64 based on the user's credentials and one or more group IDs 66 identifying groups (e.g., within an organization) to which that user belongs. The token 60 also includes a privileges field 68 listing any privileges assigned to the user. For example, one such privilege may give an administrative-level user the ability to set the system clock through a particular application programming interface (API). Note that privileges override access control checks, described below, that are otherwise performed before granting access to an object.

Figure 3:
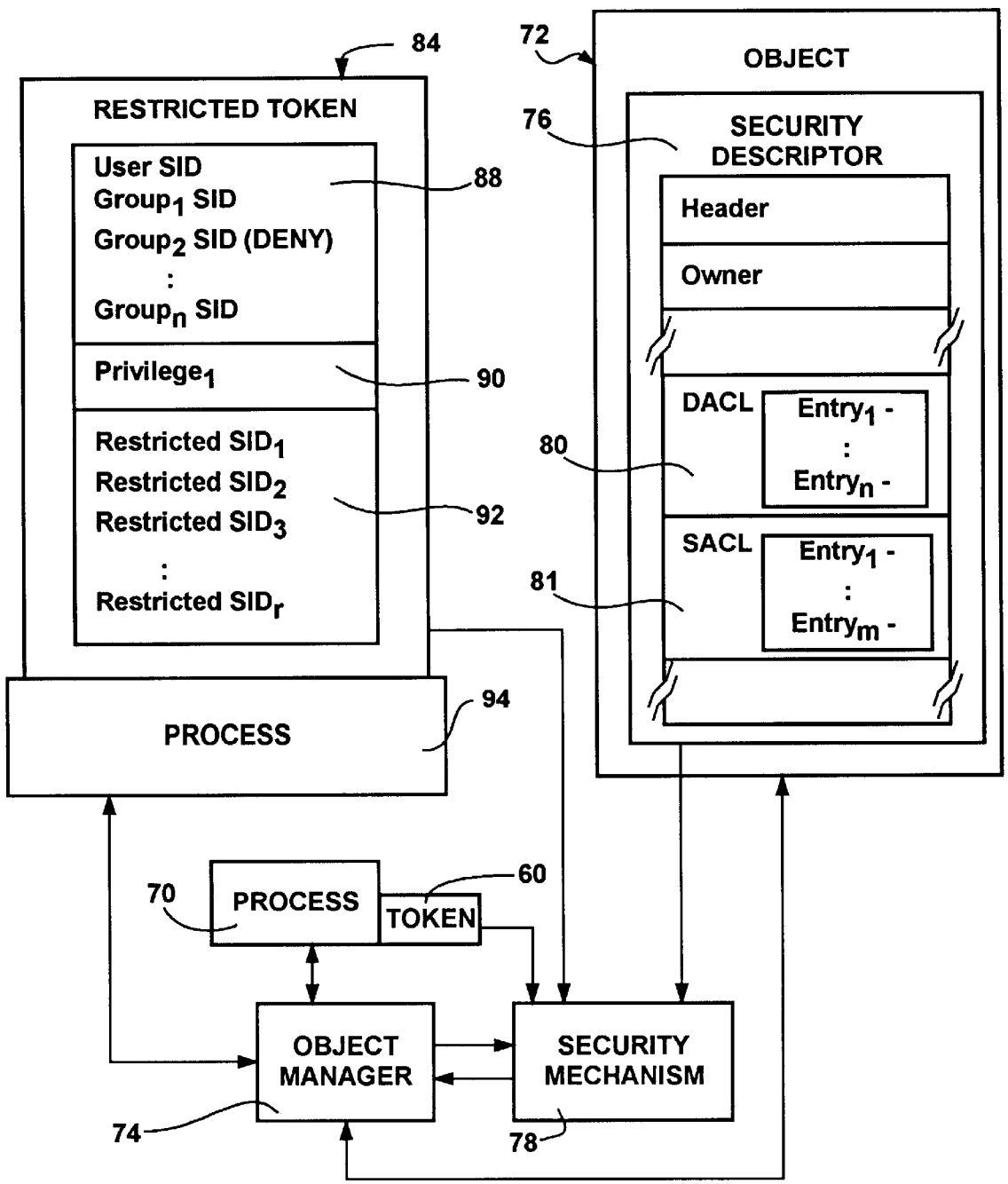
FIG. 3 is a block diagram generally representing the various components for determining whether a process may access a resource.

As will be described in more detail below and as generally represented in FIG. 3, a process 70 desiring access to an object 72 specifies the type of access it desires (e.g., obtain read/write access to a file object) and at the kernel level provides its associated token 60 to an object manager 74. The object 72 has a kernel level security descriptor 76 associated therewith, and the object manager 74 provides the security descriptor 76 and the token 60 to a security mechanism 78. The contents of the security descriptor 76 are typically determined by the owner (e.g., creator) of the object, and generally comprise a (discretionary) access control list (ACL) 80 of access control entries, and for each entry, one or more access rights (allowed or denied actions) corresponding to that entry. Each entry comprises a type (deny or allow) indicator, flags, a security identifier (SID) and access rights in the form of a bitmask wherein each bit corresponds to a permission (e.g., one bit for read access, one for write and so on). The security mechanism 78 compares the security IDs in the token 60 along with the type of action or actions requested by the process 70 against the entries in the ACL 80. If a match is found with an allowed user or group, and the type of access desired is allowable for the user or group, a handle to the object 72 is returned to the process 70, otherwise access is denied.

By way of example, a user with a token identifying the user as a member of the "Accounting" group may wish to access a particular file object with read and write access. If the file object has the "Accounting" group identifier of type allow in an entry of its ACL 80, and the group has rights enabling read and write access, a handle granting read and write access is returned, otherwise access is denied. Note that for efficiency reasons, the security check is performed only when the process 70 first attempts to access the object 72 (create or open), and thus the handle to the object stores the type of access information so as to limit the actions that can be performed therethrough.

The security descriptor 76 also includes a system ACL, or SACL 81, which comprises entries of type audit corresponding to client actions that are to be audited. Flags in each entry indicate whether the audit is monitoring successful or failed operations, and a bitmask in the entry indicates the type of operations that are to be audited. A security ID in the entry indicates the user or group being audited. For example, consider a situation wherein a particular group is being audited so as to determine whenever a member of that group that does not have write access to a file object attempts to write to that file. The SACL 81 for that file object includes an audit entry having the group security identifier therein along with an appropriately set fail flag and write access bit. Whenever a client belonging to that particular group attempts to write to the file object and fails, the operation is logged.

Note that the ACL 80 may contain one or more identifiers that are marked for denying users of groups access (as to all rights or selected rights) rather than granting access thereto. For example, one entry listed in the ACL 80 may otherwise allow members of "Group$_3$" access to the object 72, but another entry in the ACL 80 may specifically deny "Group$_{24}$" all access. If the token 60 includes the "Group$_{24}$" security ID, access will be denied regardless of the presence of the "Group$_3$" security ID. Of course to function properly, the security check is arranged so as to not allow access via the "Group$_3$" entry before checking the "DENY ALL" status of the Group$_{24}$ entry, such as by placing all DENY entries at the front of the ACL 80. As can be appreciated, this arrangement provides for improved efficiency, as one or more isolated members of a group may be separately excluded in the ACL 80 rather than having to individually list each of the remaining members of a group to allow their access.

Note that instead of specifying a type of access, a caller may request a MAXIMUM_ALLOWED access, whereby an algorithm determines the maximum type of access allowed, based on the normal UserAndGroups list versus each of the entries in the ACL 80. More particularly, the algorithm walks down the list of identifiers accumulating the rights for a given user (i.e., OR-ing the various bitmasks). Once the rights are accumulated, the user is given the accumulated rights. However, if during the walkthrough a deny entry is found that matches a user or group identifier and the requested rights, access is denied.

Restricted Tokens

In accordance with one aspect of the present invention, a restricted token is created from an existing access token (either restricted or unrestricted) as described below. As also described below, if the restricted token includes any restricted security IDs, the token is subject to an additional access check wherein the restricted security IDs are compared against the entries in the object's ACL.

The primary use of a restricted token is for a process to create a new process with a restricted version of its own token. The restricted process is then limited in the actions it may perform on resources. For example, a file object resource may have in its ACL a single restricted SID identifying the Microsoft Word application program, such that only restricted processes having the same Microsoft Word restricted SID in its associated restricted token may access the file object. Note that the original user still needs to have access to the object, so the ACL also needs to contain an access control entry granting the user access, as well as the Microsoft Word program. Then, for example, untrusted code such as downloaded via a browser could be run in a restricted process that did not have the Microsoft Word restricted Security ID in its restricted token, preventing that (possibly unruly) code's access to the file object.

For security reasons, creating a process with a different token normally requires a privilege known as the SeAssignPrimaryToken privilege. However, to allow processes to be associated with restricted tokens, process management allows one process with sufficient access to another process to modify its primary token to a restricted token, if the restricted token is derived from the primary token. By comparing the ParentTokenId of the new process's token with the TokenId of the existing process' token, the operating system 35 may ensure that the process is only creating a restricted version of itself.

A restricted token 84 has less access than (i.e., has a subset of the rights and privileges of) its parent token, and may, for example, prevent access to an object based on the type of process (as well as the user or group) that is attempting to access the object, instead of simply allowing or denying access solely based on the user or group information. A restricted token may also not allow access via one or more user or group security IDs specially marked as "USE_FOR_DENY_ONLY," even though the parent token allows access via those SIDs, and/or may have privileges removed that are present in the parent token.

Thus, one way in which to reduce access is to change an attribute of one or more user and/or group security identifiers in a restricted token so as to be unable to allow access, rather than grant access therewith. Security IDs marked USE_FOR_DENY_ONLY are effectively ignored for purposes of granting access, however, an ACL that has a "DENY" entry for that security ID will still cause access to be denied. By way of example, if the Group$_2$ security ID in the restricted token 84 (FIG. 3) is marked USE_FOR_DENY_ONLY, when the user's process attempts to access an object 72 having the ACL 80 that lists Group$_2$ as allowed, that entry is effectively ignored and the process will have to gain access by some other security ID. However, if the ACL 80 includes an entry listing Group$_2$ as DENY with respect to the requested type of action, then once tested, no access will be granted regardless of other security IDs.

Note that access to objects cannot be safely reduced by simply removing a security ID from a user's token, since that security ID may be marked as "DENY" in the ACL of some objects, whereby removing that identifier would grant rather than deny access to those objects. Thus, the present invention allows a SID's attributes to be modified to USE_FOR_DENY_ONLY in a restricted token. Moreover, no mechanism is provided to turn off this USE_FOR_DENY_ONLY security check.

Another way to reduce access in a restricted token is to remove one or more privileges relative to the parent token. For example, a user having a normal token with administrative privileges may set up a system such that unless that user specifically informs the system otherwise, the user's processes will run with a restricted token having no privileges. As can be appreciated, this prevents inadvertent errors that may occur when the user is not intentionally acting in an administrative capacity. Similarly, programs may be developed to run in different modes depending on a user's privileges, whereby an administrative-level user has to run the program with administrative privileges to perform some operations, but operate with reduced privileges to perform more basic operations. Again, this helps to prevent serious errors that might otherwise occur when such a user is simply attempting to perform normal operations but is running with elevated privileges.

Yet another way to reduce a token's access is to add restricted security IDs thereto. Restricted security IDs are numbers representing processes, resource operations and the like, made unique such as by adding a prefix to GUIDs or numbers generated via a cryptographic hash or the like, and may include information to distinguish these Security IDs from other Security IDs. Although not necessary to the invention, for convenience, various application programming interfaces (APIs) are provided to interface applications and users with Security IDs, such as to accomplish a GUID to Security ID conversion, represent the Security IDs in human readable form, and so on.

In addition to restricting access to a resource based on the application (process) requesting access, specific Security IDs may be developed based on likely restricted uses of a resource. By way of example, a Security ID such as "USE_WINDOWS" would be placed in the default ACLs of windowstations and the desktop to allow access thereto only by a process having a corresponding SID in its restricted token. Similarly, the default ACL of a printer object may include a "USE_PRINTING" SID in its default ACL, so that a process could create a restricted process with only this Security ID listed in its restricted token, whereby the restricted process would be able to access the printer but no other resource. As can be appreciated, numerous other Security IDs for accessing other resources may be implemented.

As shown in FIG. 3, restricted security IDs are placed in a special field 82 of a restricted token 84, such as for identifying a process that is requesting an action. As described in more detail below, by requiring that both at least one user (or group) security ID and at least one restricted security ID be granted access to an object, an object may selectively grant access based on a requesting process (as well as a user or group). For example, an object such as a file object may allow Microsoft Word, Microsoft Excel or Windows Explorer processes to access it, but deny access to any other process. Moreover, each of the allowed processes may be granted different access rights.

The design provides for significant flexibility and granularity within the context of a user to control what different processes are allowed to do. One expected usage model for these features includes a distinction between trusted applications and untrusted applications. Note that the term "application" is used in a generic sense to describe any piece of code that may be executed in "user mode" under a given security context. For example, an application such as Microsoft Word may run as a process from an ActiveX control, which may be loaded into an existing process and executed. Applications which launch other applications, such as Microsoft's Internet Explorer, may introduce a "trust model" using this infrastructure.

By way of example, an application such as Internet Explorer can use restricted tokens to execute untrusted executable code under different processes, and control what those processes can do within the user's overall access rights and privileges. To this end, the Internet Explorer application creates a restricted token from its own token, and determines which restricted security IDs will be placed in the restricted token. Then, the untrusted executable code is restricted to accessing only those objects that the restricted context may access.

Moreover, entries corresponding to restricted SIDs and other restrictions may be placed in a field of the SACL 81 for auditing purposes. For example, the SACL of a resource may be set up to audit each time that Internet Explorer program attempts read or write access of that resource, and/or the use of SIDs marked USE_FOR_DENY_ONLY may be audited. For purposes of simplicity, auditing will not be described in detail hereinafter, however it can be readily appreciated that the concepts described with respect to access control via restricted SIDs are applicable to auditing operations.

To create a restricted token from an existing token, an application programming interface (API) is provided, named NtFilterToken, as set forth below:

```
NTSTATUS
NtFilterToken (
    IN HANDLE ExistingTokenHandle,
    IN ULONG Flags,
    IN PTOKEN_GROUPS SidsToDisable OPTIONAL,
    IN PTOKEN_PRIVILEGES PrivilegesToDelete OPTIONAL,
    IN PTOKEN_GROUPS RestrictingSids OPTIONAL,
    OUT PHANDLE NewTokenHandle
    );
```

The NtFilterToken API is wrapped under a Win32 API named CreateRestrictedToken, further set forth below:

```
WINADVAPI
BOOL
APIENTRY
CreateRestrictedToken (
    IN HANDLE ExistingTokenHandle,
    IN DWORD Flags,
    IN DWORD DisableSidCount,
    IN PSID_AND_ATTRIBUTES SidsToDisable OPTIONAL,
    IN DWORD DeletePrivilegeCount,
    IN PLUID_AND_ATTRIBUTES PrivilegesToDelete OPTIONAL,
    IN DWORD RestrictedSidCount,
```

-continued

```
IN PSID_AND_ATTRIBUTES SidsToRestrict OPTIONAL,
OUT PHANDLE NewTokenHandle
);
```

Figure 2:
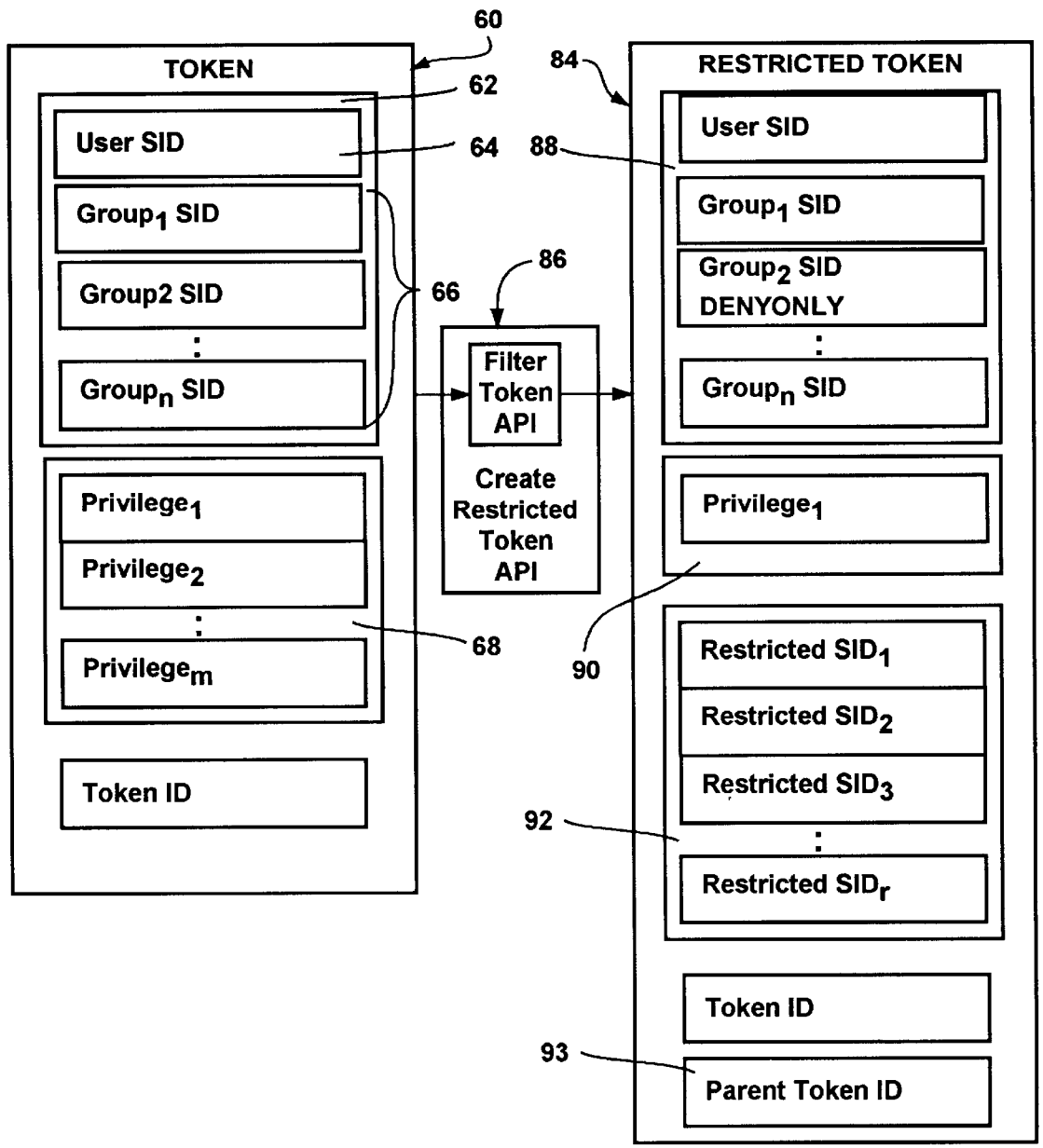
FIG. 2 is a block diagram generally representing the creation of a restricted token from an existing token in accordance with one aspect of the present invention.
Figure 4A:
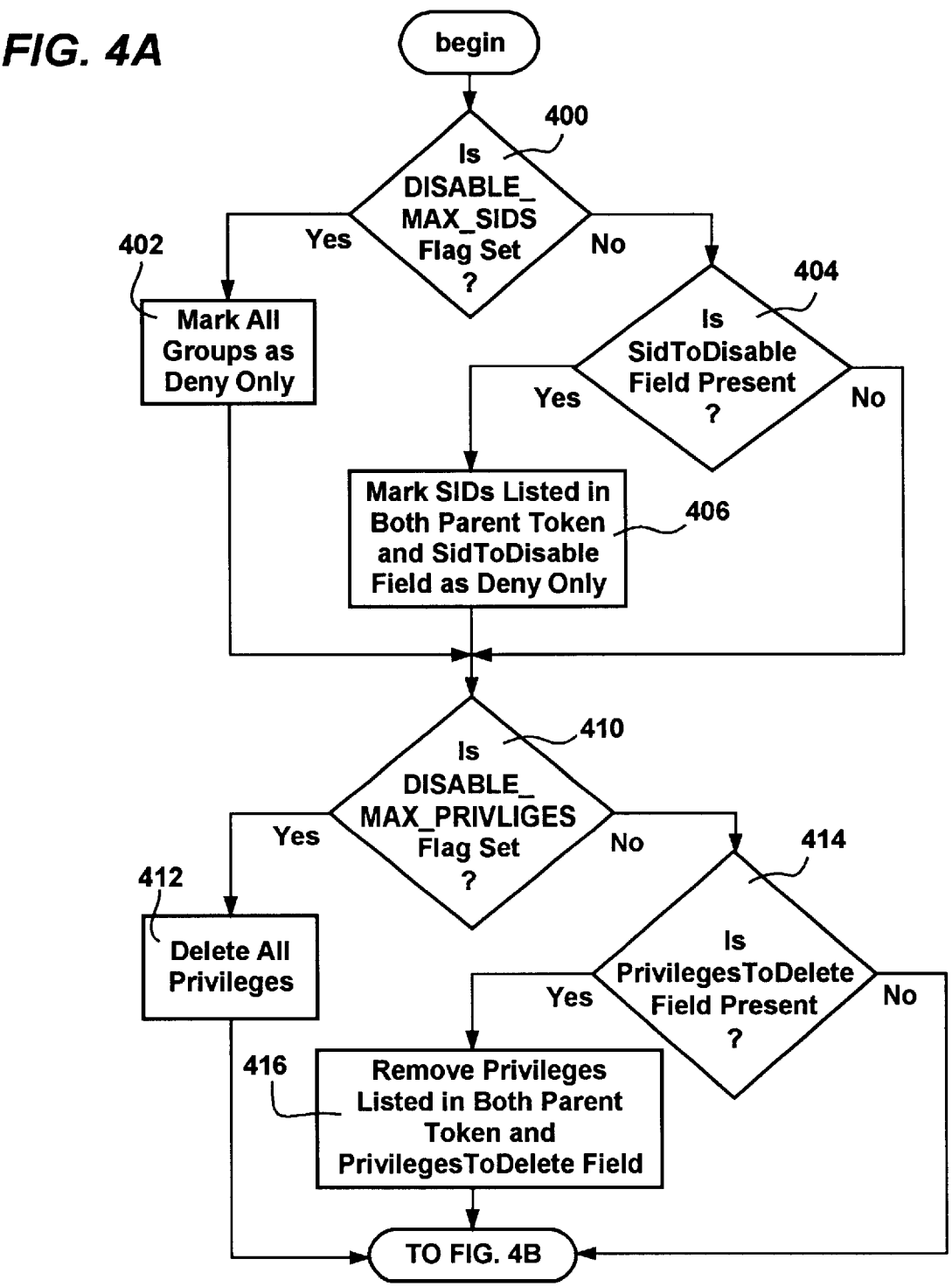
FIGS. 4A–4B comprise a flow diagram representing the general steps taken to create a restricted token from an existing token in accordance with one aspect of the present invention.
Figure 4B:
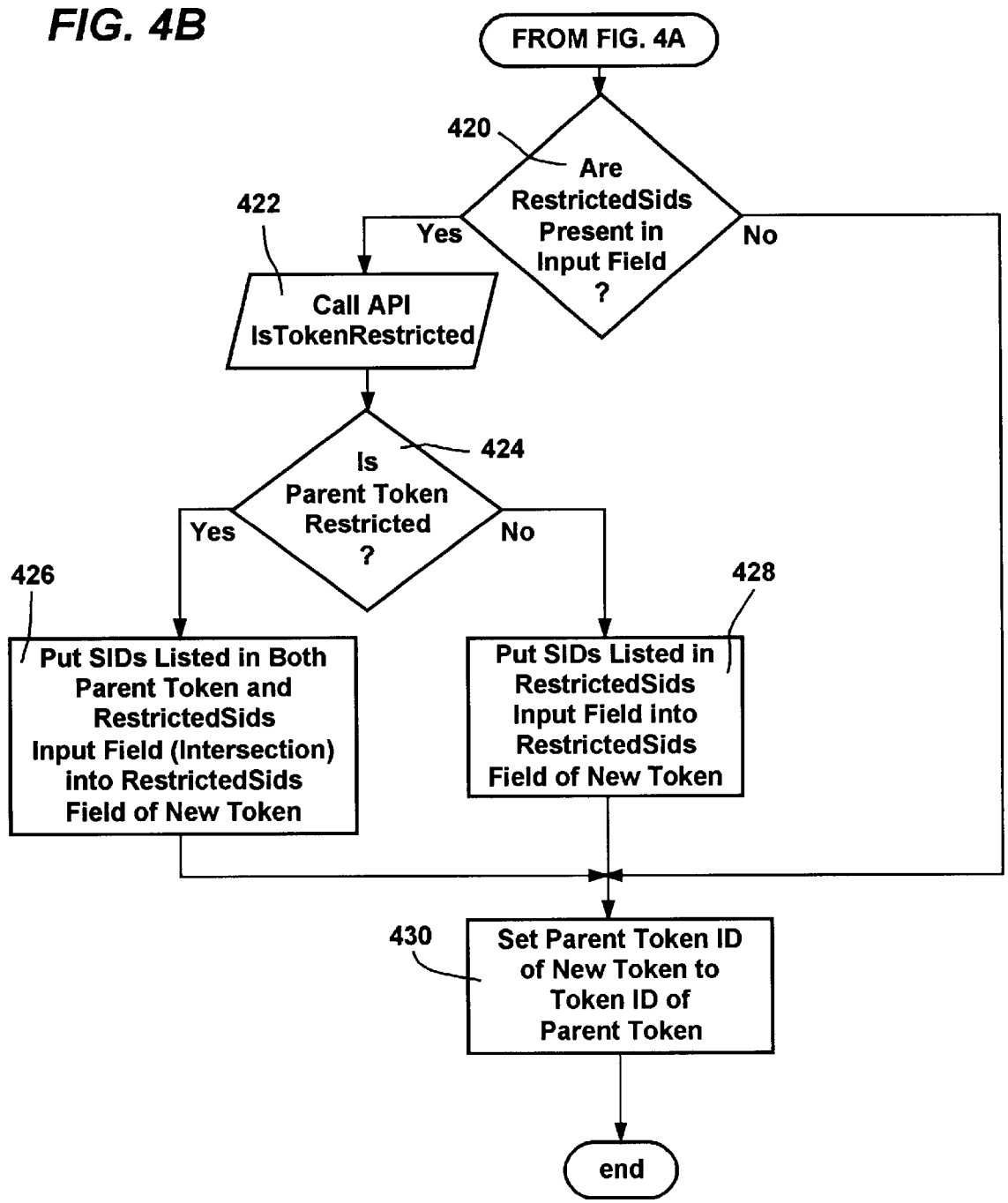

As represented in FIGS. 2 and 4A–4B, these APIs 86 work in conjunction to take an existing token 60, either restricted or unrestricted, and create a modified (restricted) token 84 therefrom. The structure of a restricted token, which contains the identification information about an instance of a logged-on user, includes three new fields, ParentTokenId, RestrictedSidCount and RestrictedSids (shown in boldface below):

```
Typedef struct _TOKEN {
    TOKEN_SOURCE TokenSource;              // Ro: 16-Bytes
    LUID TokenId;                          // Ro: 8-Bytes
    LUID AuthenticationId;                 // Ro: 8-Bytes
    LUID ParentTokenId;                    // Ro: 8-Bytes
    LARGE_INTEGER ExpirationTime;          // Ro: 8-Bytes
    LUID ModifiedId;                       // Wr: 8-Bytes
    ULONG UserAndGroupCount;               // Ro: 4-Bytes
    ULONG RestrictedSidCount;              // Ro: 4-Bytes
    ULONG PrivilegeCount;                  // Ro: 4-Bytes
    ULONG VariableLength;                  // Ro: 4-Bytes
    ULONG DynamicCharged;                  // Ro: 4-Bytes
    ULONG DynamicAvailable;                // Wr: 4-Bytes (Mod)
    ULONG DefaultOwnerIndex;               // Wr: 4-Bytes (Mod)
    PSID_AND_ATTRIBUTES
                UserAndGroups;             // Wr: 4-Bytes (Mod)
    PSID_AND_ATTRIBUTES Restricted-        // Ro: 4-Bytes
    Sids;
    PSID PrimaryGroup;                     // Wr: 4-Bytes (Mod)
    PLUID_AND_ATTRIBUTES Privileges;       // Wr: 4-Bytes (Mod)
    PULONG DynamicPart;                    // Wr: 4-Bytes (Mod)
    PACL DefaultDacl;                      // Wr: 4-Bytes (Mod)
    TOKEN_TYPE TokenType;                  // Ro: 1-Byte
    SECURITY_IMPERSONATION_LEVEL
                ImpersonationLevel;        // Ro: 1-Byte
    UCHAR TokenFlags;                      // Ro: 4-Bytes
    BOOLEAN TokenInUse;                    // Wr: 1-Byte
    PSECURITY_TOKEN_PROXY_DATA
                ProxyData;                 // Ro: 4-Bytes
    PSECURITY_TOKEN_AUDIT_DATA
                AuditData;                 // Ro: 4-Bytes
    ULONG VariablePart;                    // Wr: 4-Bytes (Mod)
} TOKEN, * PTOKEN;
```

Note that when a normal (non-restricted) token is now created, via a CreateToken API, the RestrictedSids field is empty, as is the ParentTokenId field.

To create a restricted token 84, a process calls the CreateRestrictedToken API with appropriate flag settings and/or information in the input fields, which in turn invokes the NtFilterToken API. As represented beginning at step 400 of FIG. 4A, the NtFilterToken API checks to see if a flag named DISABLE_MAX_SIDS is set, which indicates that all Security IDs for groups in the new, restricted token 84 should be marked as USE_FOR_DENY_ONLY. The flag provides a convenient way to restrict the (possibly many) groups in a token without needing to individually identify each of the groups. If the flag is set, step 400 branches to step 402 which sets a bit indicating USE_FOR_DENY_ONLY on each of the group security IDs in the new token 84.

If the DISABLE_MAX_SIDS flag is not set, then step 400 branches to step 404 to test if any security IDs are individually listed in a SidsToDisable Field of the NtFilterToken API. As shown at step 404 of FIG. 4A, when the optional SidsToDisable input field is present, at step 406, any Security IDs listed therein that are also present in the UserAndGroups field 62 of the parent token 60 are individually marked as USE_FOR_DENY_ONLY in the UserAndGroups field 88 of the new restricted token 84. As described above, such Security IDs can only be used to deny access and cannot be used to grant access, and moreover, cannot later be removed or enabled. Thus, in the example shown in FIG. 2, the Group$_2$ security ID is marked as USE_FOR_DENY_ONLY in the restricted token 84 by having specified the Group$_2$ security ID in the SidsToDisable input field of the NtFilterToken API 86.

The filter process then continues to step 410 of FIG. 4A, wherein a flag named DISABLE_MAX_PRIVILEGES is tested. This flag may be similarly set as a convenient shortcut to indicate that all privileges in the new, restricted token 84 should be removed. If set, step 410 branches to step 412 which deletes all privileges from the new token 84.

If the flag is not set, step 410 branches to step 414 wherein the optional PrivilegesToDelete field is examined. If present when the NtFilterToken API 86 is called, then at step 416, any privileges listed in this input field that are also present in the privileges field 68 of the existing token 60 are individually removed from the privileges field 90 of the new token 84. In the example shown in FIG. 2, the privileges shown as "Privilege$_2$" to "Privilege$_m$" have been removed from the privileges field 90 of the new token 84 by having specified those privileges in the PrivilegesToDelete input field of the NtFilterToken API 86. In keeping with one aspect of the present invention, as described above, this provides the ability to reduce the privileges available in a token. The process continues to step 420 of FIG. 4B. When creating a restricted token 84, if SIDs are present in the RestrictingSids input field at step 420, then a determination is made as to whether the parent token is a normal token or is itself a restricted token having restricted SIDs. An API, IsTokenRestricted is called at step 422, and resolves this question by querying (via the NtQueryInformationToken API) the RestrictingSids field of the parent token to see if it is not NULL, whereby if not NULL, the parent token is a restricted token and the API returns a TRUE. If the test is not satisfied, the parent token is a normal token and the API returns a FALSE. Note that for purposes of the subsequent steps 426 or 428, a parent token that is restricted but does not have restricted SIDs (i.e., by having privileges removed and/or USE_FOR_DENY_ONLY SIDs) may be treated as being not restricted.

At step 424, if the parent token is restricted, step 424 branches to step 426 wherein any security IDs that are in both the parent token's restricted Security ID field and the API's restricted Security ID input list are put into the restricted Security ID field 92 of the new token 84. Requiring restricted security IDs to be common to both lists prevents a restricted execution context from adding more security IDs to the restricted Security ID field 92, an event which would effectively increase rather than decrease access. Similarly, if none are common at step 426, any token created still has to be restricted without increasing the access thereof, such as by leaving at least one restricted SID from the original token in the new token. Otherwise, an empty restricted SIDs field in the new token might indicate that the token is not restricted, an event which would effectively increase rather than decrease access.

Alternatively, if at step 424 the parent token is determined to be a normal token, then at step 428 the RestrictingSids field 92 of the new token 84 is set to those listed in the input field. Note that although this adds security IDs, access is actually decreased since a token having restricted SIDs is subject to a secondary access test, as described in more detail below.

Lastly, step 430 is also executed, whereby the ParentTokenId 93 in the new token 84 is set to the TokenId of the existing (parent) token. This provides the operating system with the option of later allowing a process to use a restricted version of its token in places that would not normally be allowed except to the parent token.

Figure 5:
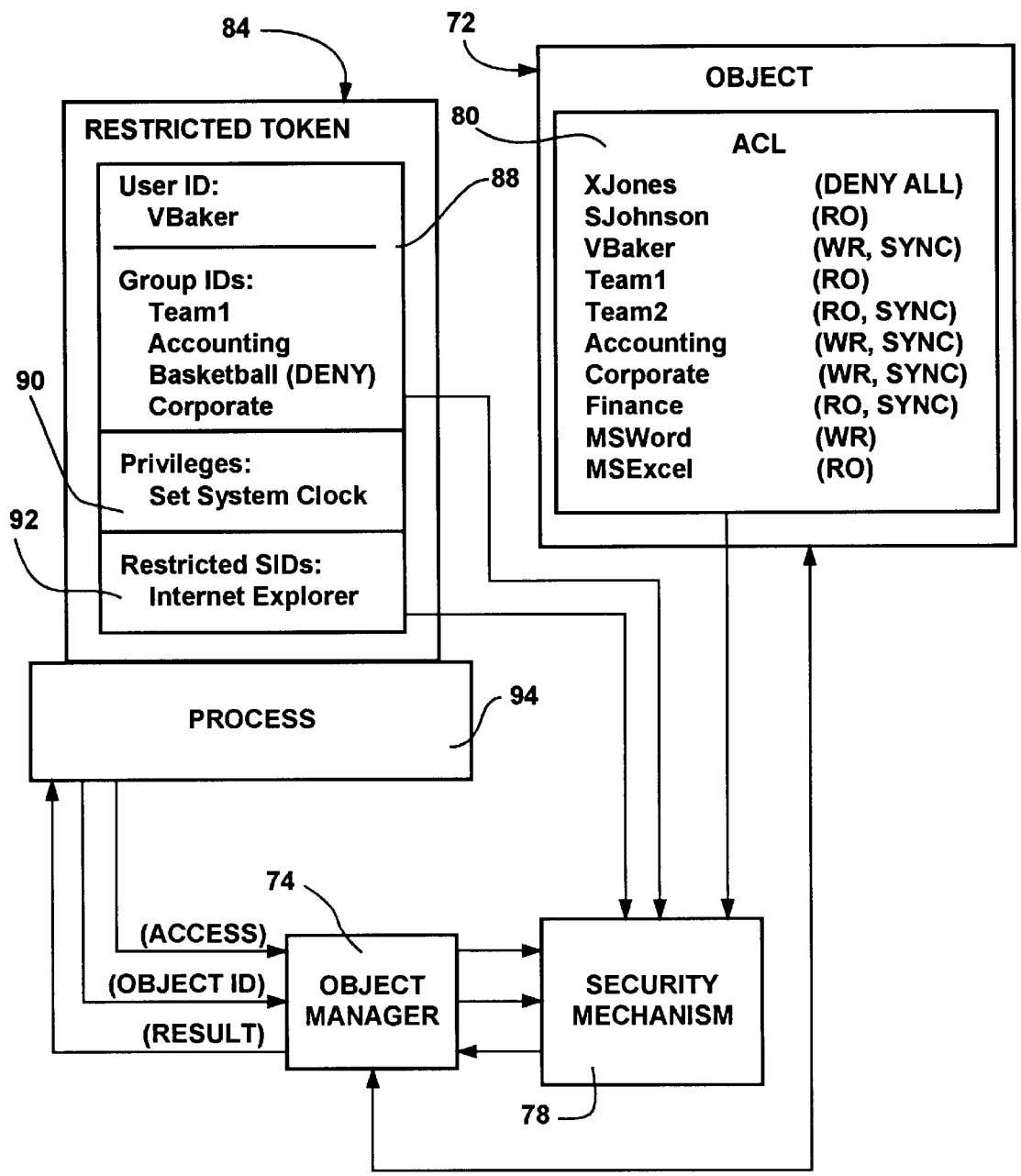
FIG. 5 is a block diagram generally representing a process having a restricted token associated therewith attempting to access a resource in accordance with one aspect of the present invention.
Figure 6:
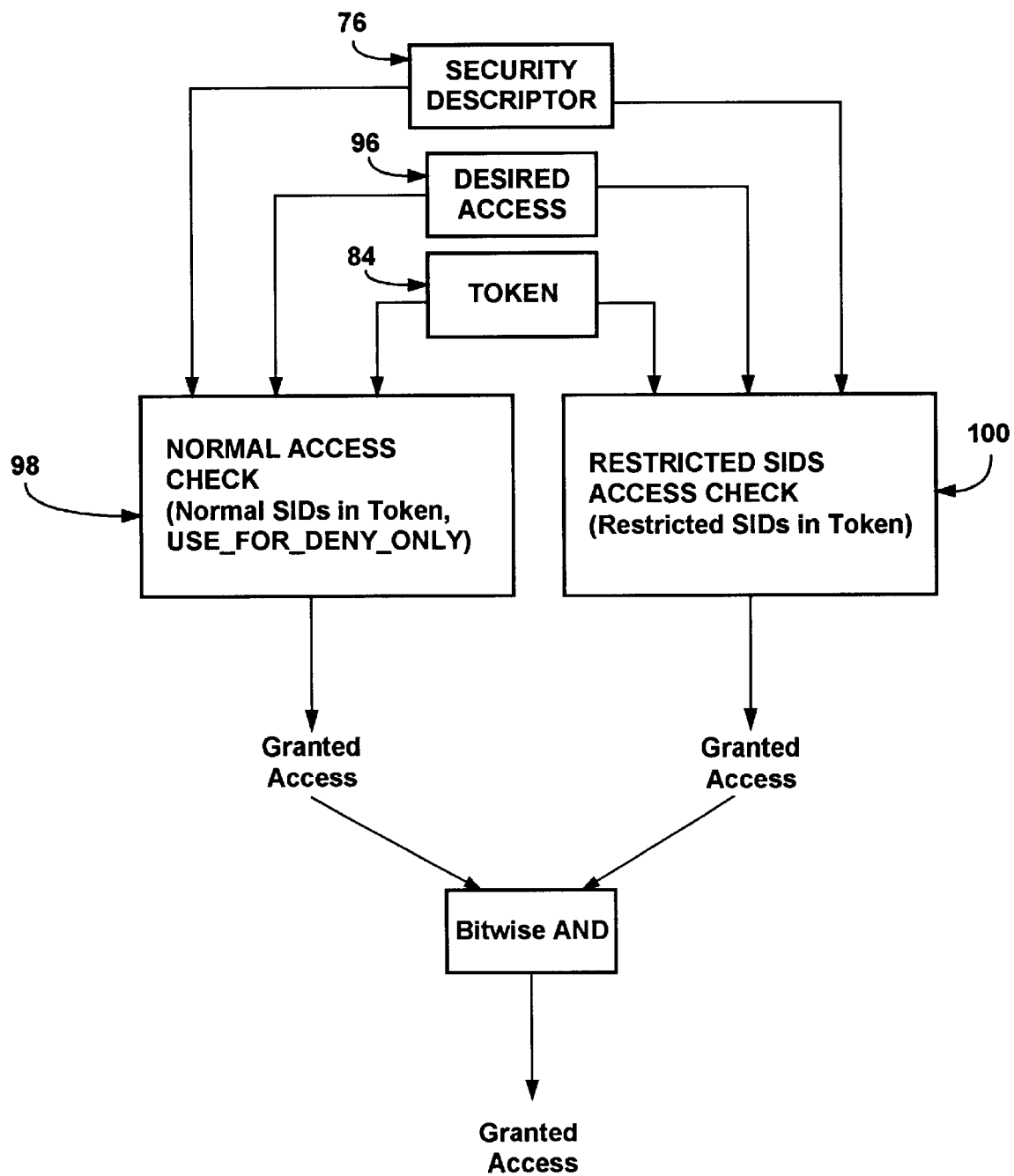
FIG. 6 is a block diagram generally representing the logic for determining access to an object of a process having a restricted token associated therewith in accordance with an aspect of the present invention.
Figure 7:
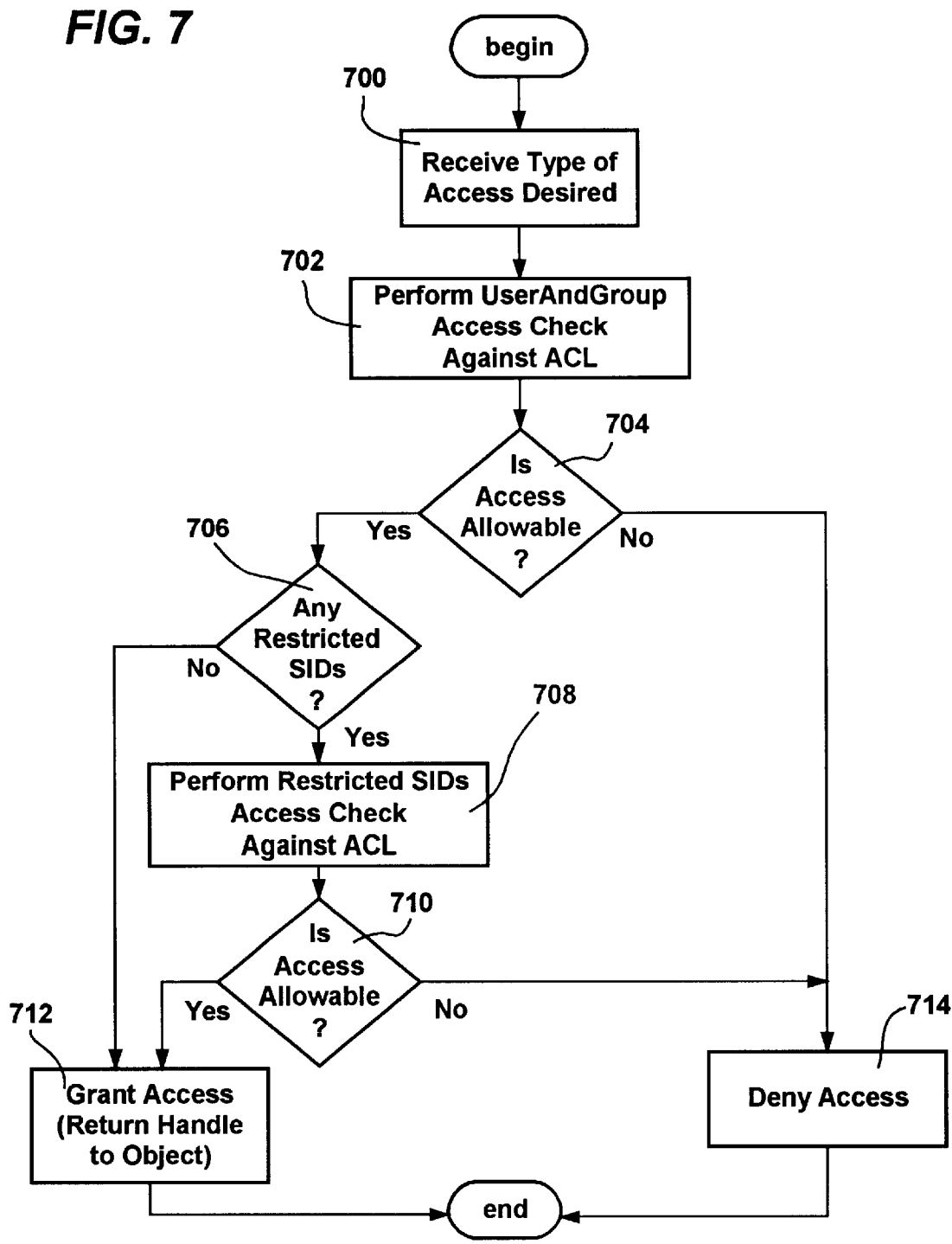
FIG. 7 is a flow diagram representing the general steps taken when determining whether to grant a process access to a resource in accordance with an aspect of the present invention.

Turning an explanation of the operation of the invention with particular reference to FIG. 5–7, as represented in FIG. 5, a restricted process 94 has been created and is attempting to open a file object 70 with read/write access. In the security descriptor of the object 72, the ACL 80 has a number of security IDs listed therein along with the type of access allowed for each ID, wherein "RO" indicates that read only access is allowed, "WR" indicates read/write access and "SYNC" indicates that synchronization access is allowed. Note that "XJones" is specifically denied access to the object 72, even if "XJones" would otherwise be allowed access through membership in an allowed group. Moreover, the process 94 having this token 84 associated therewith will not be allowed to access any object via the "Basketball" security ID in the token84, because this entry is marked "DENY" (i.e., USE_FOR_DENY_ONLY).

For purposes of security, restricted security contexts are primarily implemented in the Windows NT kernel. To attempt to access the object 72, the process 94 provides the object manager 74 with information identifying the object to which access is desired along with the type of access desired, (FIG. 7, step 700). In response, as represented at step 702, the object manager 74 works in conjunction with the security mechanism 78 to compare the user and group security IDs listed in the token 84 (associated with the process 94) against the entries in the ACL 80, to determine if the desired access should be granted or denied.

As generally represented at step 704, if access is not allowed for the listed user or groups, the security check denies access at step 714. However, if the result of the user and group portion of the access check indicates allowable access at step 704, the security process branches to step 706 to determine if the restricted token 84 has any restricted security IDs. If not, there are no additional restrictions, whereby the access check is complete and access is granted at step 712 (a handle to the object is returned) based solely on user and group access. In this manner, a normal token is essentially checked as before. However, if the token includes restricted security IDs as determined by step 706, then a secondary access check is performed at step 708 by comparing the restricted security IDs against the entries in the ACL 80. If this secondary access test allows access at step 710, access to the object is granted at step 712. If not, access is denied at step 714.

As logically represented in FIG. 6, a two-part test is thus performed whenever restricted Security IDs are present in the token 84. Considering the security IDs in the token 84 and the desired access bits 96 against the security descriptor of the object 72, both the normal access test and (bitwise AND) the restricted security IDs access test must grant access in order for the process to be granted access to the object. Although not necessary to the invention, as described above, the normal access test proceeds first, and if access is denied, no further testing is necessary. Note that access may be denied either because no security ID in the token matched an identifier in the ACL, or because an ACL entry specifically denied access to the token based on a security identifier therein. Alternatively, a token may be arranged to have multiple sets of restricted SIDS, with a more complex Boolean expression covering the evaluation of those SIDS, e.g., grant access if set A OR (set B AND set C) allow access.

Thus, in the example shown in FIG. 5, no access to the object 72 will be granted to the process 94 because the only Restricted SID in the token 84 (field 92) identifies "Internet Explorer," while there is no counterpart restricted SID in the object's ACL 80. Although the user had the right to access the object via a process running with a normal token, the process 94 was restricted so as to only be able to access objects having an "Internet Explorer" SID (non-DENY) in their ACLs.

Note that instead of specifying a type of access, the caller may have specified MAXIMUM_ALLOWED access, whereby as described above, an algorithm walks through the ACL 80 determining the maximum access. With restricted tokens, if any type of user or group access at all is granted, the type or types of access rights allowable following the user and groups run is specified as the desired access for the second run, which checks the RestrictedSids list. In this way, a restricted token is certain to be granted less than or equal to access than the normal token.

Lastly, it should be noted that the security model of the present invention may be used in conjunction with other security models. For example, capability-based security models residing on top of an operating system may be used above the operating system-level security model of the present invention.

Jobs

A Job is a kernel object having a set of processes organized therein, wherein each job may have a different type of restriction associated therewith. In keeping with the present invention, restricted tokens may be integrated with Windows NT Job Objects to allow management of multiple processes running under the same restrictions. A Job object restriction is set forth below:

```
Typedef struct _JOBOBJECT_SECURITY_LIMIT_INFORMATION {
    ULONG SecurityLimitFlags ;
    HANDLE JobToken ;
    PTOKEN_GROUPS SidsToDisable ;
    PTOKEN_PRIVILEGES PrivilegesToDelete ;
    PTOKEN_GROUPS RestrictedSids ;
} JOBOBJECT_SECURITY_LIMIT_INFORMATION,
*PJOBOBJECT_SECURITY_LIMIT_INFORMATION ;
``` wherein the relevant SecurityLimitFlags may be:

```
#define JOB_OBJECT_SECURITY_FILTER_TOKENS    0x00000008
```

These various pieces of information can be set on a Job object using an NtSetInformationJobObject API, while a process is assigned to a job using the NtAssignProcessToJobObject API. The security limit set on the job takes effect when a process is assigned. To restrict a job, the JOB_OBJECT_SECURITY_FILTER_TOKENS limit flag is set, whereby the primary token of the process being assigned to the job is filtered using the SidsToDisable, PrivilegesToDelete and RestrictedSids information provided in the security limit information, in a similar manner to how tokens associated with processes are filtered as described above.

Figure 8:
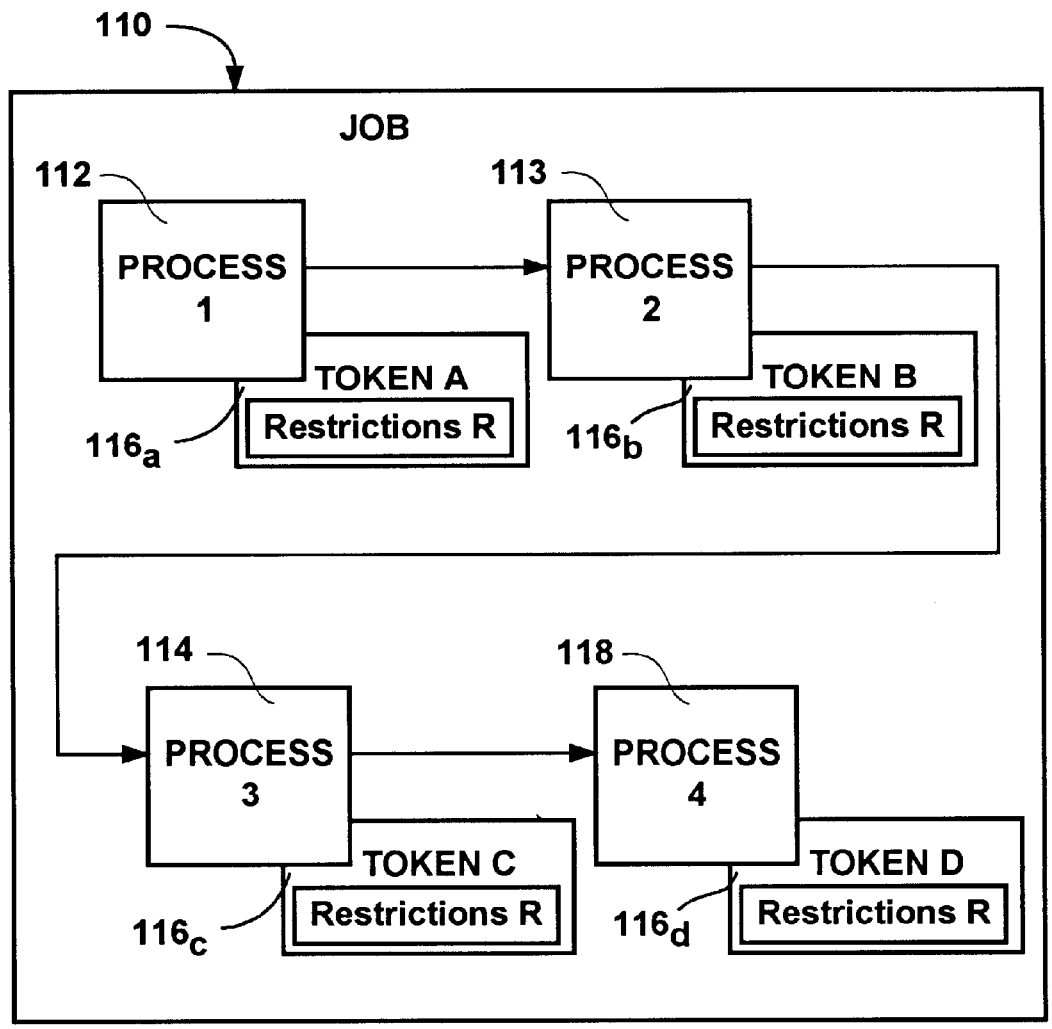
FIG. 8 is a representation of a job object having multiple processes therein with common restrictions.

As shown in FIG. 8, a job 110 has a number of processes (e.g., processes 112–114) assigned thereto via the job NtAssignProcessToJobObject API. Each process 112–114 has a respective token $116_a$–$116_c$ associated therewith that is the same with respect to its restrictions, shown as "Restrictions R." For example, the Job object 110 restricts the processes 112–114 therein to only perform certain operations, because the tokens $116_a$–$116_c$ under which they are running have certain Security IDs (e.g., Administrator SID) disabled, certain privileges removed and/or a set of restricted Security IDs added. Note that the tokens may be the same with respect to their other access rights as well, in which event all of the tokens are essentially identical, but this is not required. If a process (e.g., the process 114) produces another process 118, that process 118 also runs in the job 110 with the same restrictions R, as the job object 110 ensures that the same restrictions R are associated with the new process 118 via its token $116_d$.

RESTRICTED TOKENS OVER A NETWORK

Figure 9:
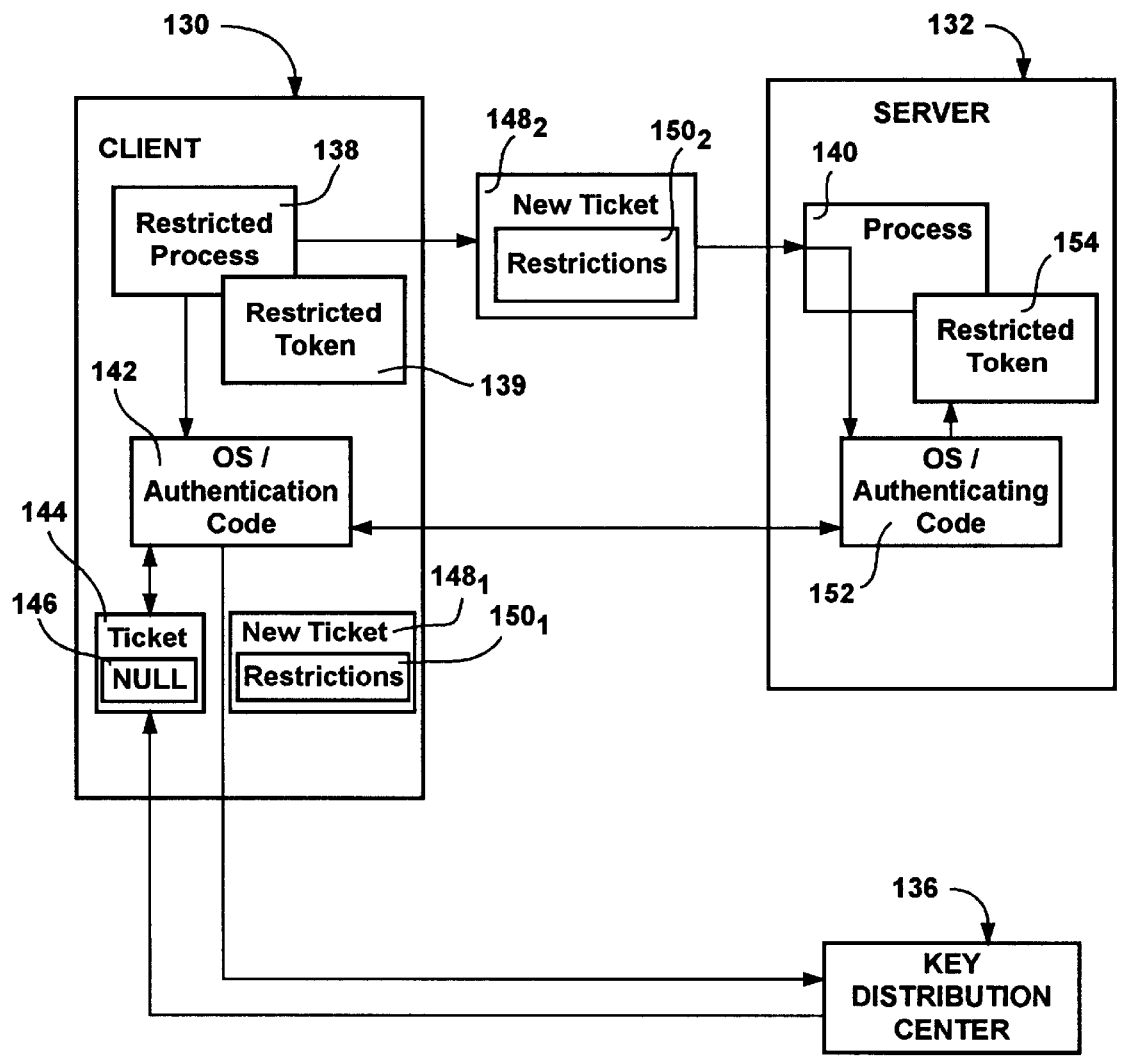
FIG. 9 is a representation showing an implementation of restricted tokens over a network in accordance with another aspect of the present invention.
Figure 10:
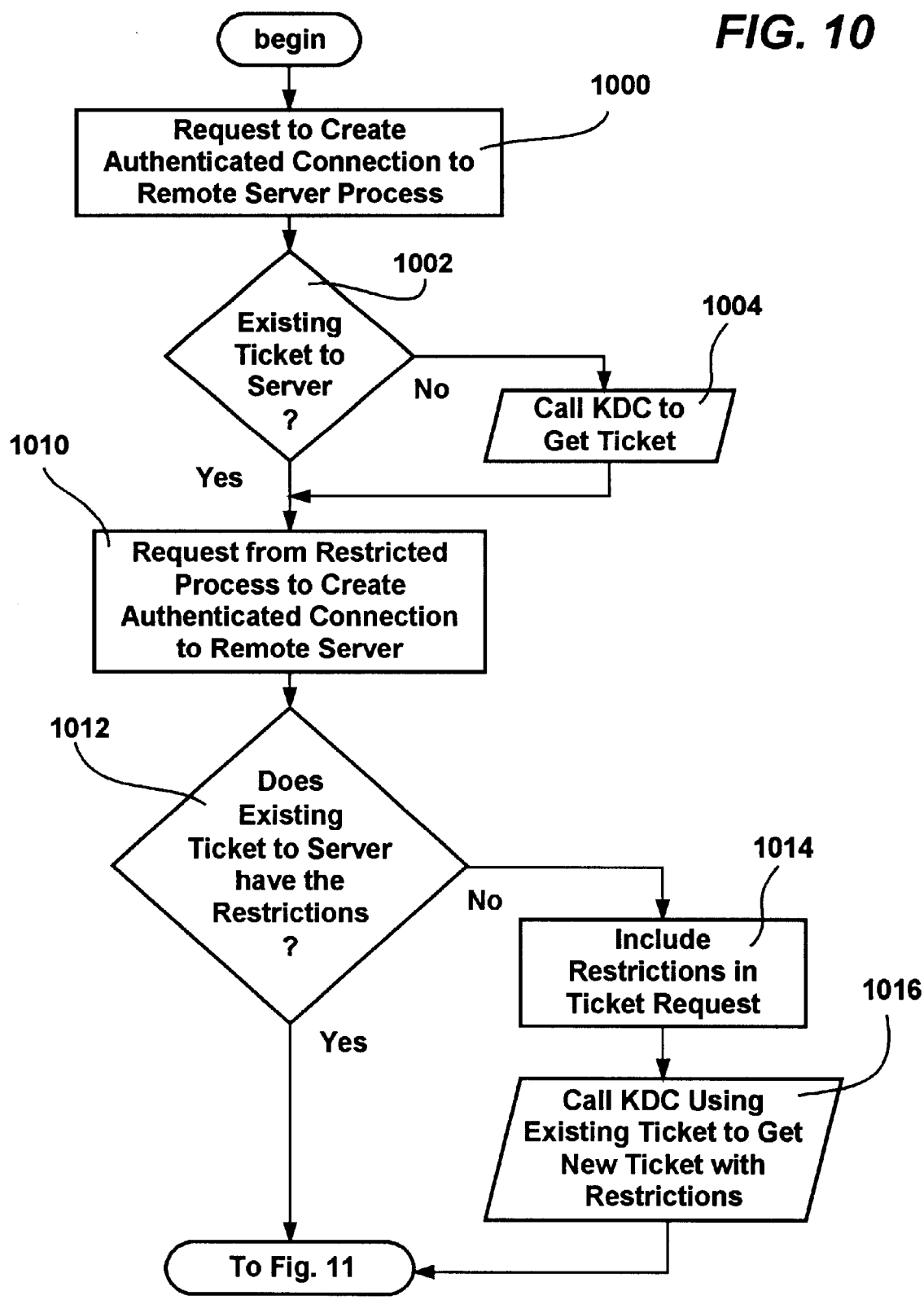
FIGS. 10–11 comprise a flow diagram representing the general steps taken when using restricted tokens over a network.
Figure 11:
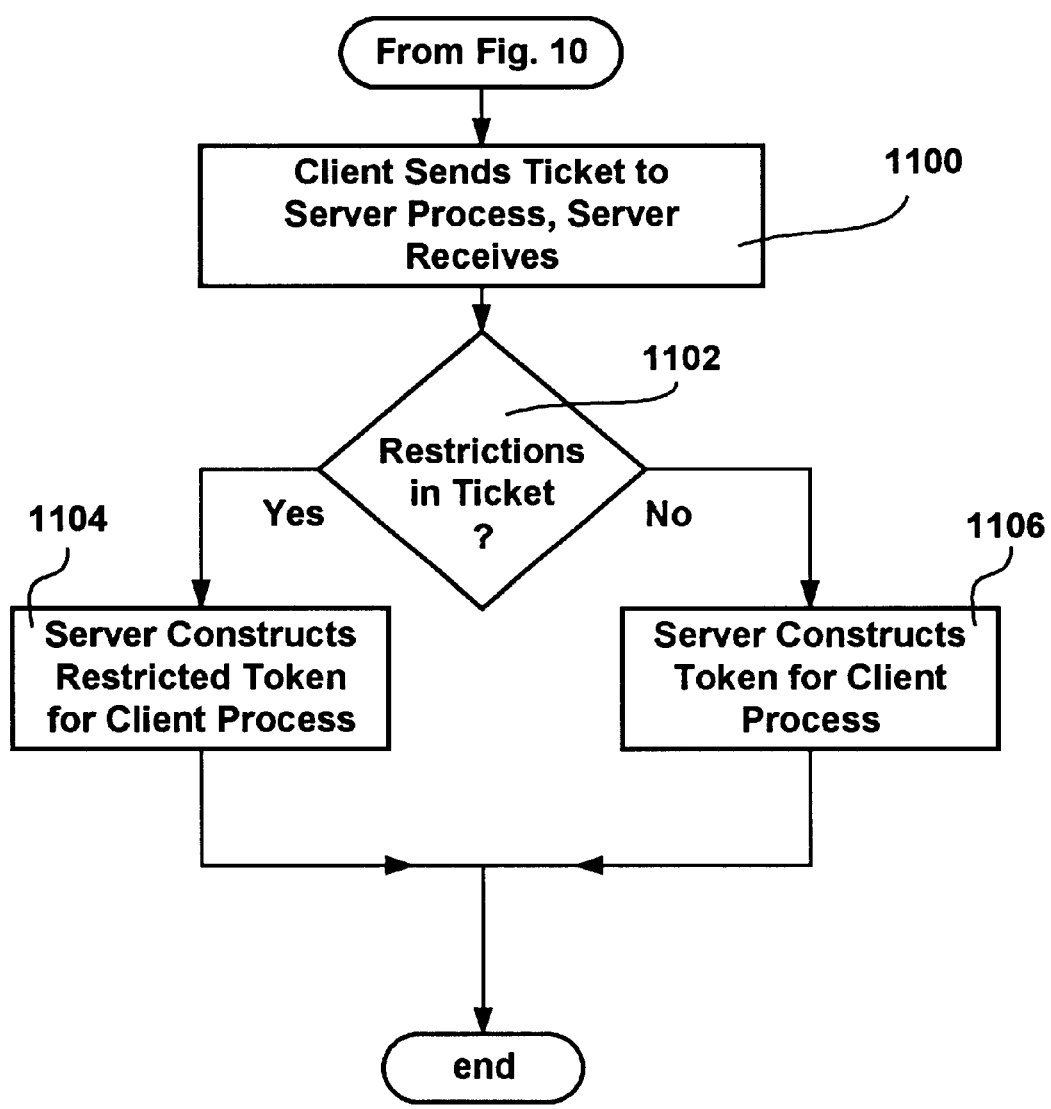

In accordance with another aspect of the present invention, restricted tokens may be used over a network connection, as described herein with particular reference to FIGS. 9–11. To this end, some authentication protocols allow a client to specify special restrictions when authenticating. For example, the Kerberos protocol allows for specifying restrictions by adding a field to an authentication ticket that restricts the authority granted by the ticket. As described below, this facility can be used by the client and server operating systems to enforce restrictions over a network connection.

As shown in FIG. 9, when a client 130 desires a connection to a server 132, authentication is required. According to the Kerberos protocol, authentication of the connection to the server 132 is accomplished via a ticket 134. The ticket is initially received by the client 130 from a ticket-issuing facility on the network known as a Key Distribution Center (KDC) 136. The ticket 134 is re-useable for a period of time, whereby even if the session is terminated, the client 130 does not have to repeat the authentication process while the ticket 134 is still valid.

Thus, as shown in the flow diagrams of FIG. 10–11, when a process (e.g., the restricted process 138 having a restricted token 139 associated therewith) attempts to create an authenticated connection to another process 140 on another machine 132, at step 1000 the process 138 calls into the authentication code inside its operating system 142 requesting the connection. For Kerberos, at step 1002, the operating system code 142 first looks for an existing authentication ticket to the server 132. If there is no existing ticket, step 1002 will branch to step 1004 wherein the code will call the KDC 136 to request a ticket 144 for the service. In the request to the KDC 136, the client 130 may provide restrictions to be placed inside the ticket 144. Normally, however, none are included. Once returned to the client 130, the ticket 144 enables the authentication (e.g., client request, server challenge, client response) to take place between the client and server.

Step 1010 takes place either when the client process is authenticated (if the process that initiated the original connection was the restricted process 138), or later, when the client operating system receives a request from the restricted process 138 to authenticate to a server 132. In step 1010, the restricted process 138 requests the authenticated connection to the remote server process 140 (unless it has already done so). In response, at step 1012, the client operating system 142 will look for an existing ticket to the server 132 having appropriate restrictions present in its restrictions field 146 therein. If the appropriate restrictions are not present, (e.g., as shown as NULL in FIG. 9), at step 1014 the operating system 142 will include the restrictions placed on the restricted client process 138, and at step 1016 will use the ticket-granting ticket 144 of the client 130 to request a new ticket $148_1$ from the KDC 136. The KDC 136 will include these restrictions in a restrictions field $150_1$ of the ticket $148_1$ it returns. For example, the restrictions may comprise a list of restricted security IDs, a list of security IDs to mark as deny only, and/or a list of privileges to delete.

The client process 138 then sends a copy 1482 of that ticket to the server process 140, as represented by step 1100 of FIG. 11. When the server operating system 152 constructs a token 154 from that ticket $148_2$, it will recognize the restrictions $150_2$, (step 1102), and at step 1104 apply them to the (restricted) token it creates, i.e., a restricted token 154. If there are no restrictions, a normal token will be created via step 1106. In any event, the copy of the client's access token 154 on the server 132 has the same restrictions as the counterpart token 139 of the process 138 on the client machine 130. Note that privileges are removed in order to restrict a token, however once removed they are not known when a restricted token is sent to a remote location, and thus cannot be later recreated at that remote location. However, it is alternatively feasible to disable privileges with a bit, whereby the privilege information remains with a restricted token and may be later recreated.

Note that while a restricted process 138 is capable of directly requesting a ticket from the KDC 136 without going through the authenticating code (and its libraries), the process 138 cannot obtain a ticket without obtaining a password from the user. This is because the process 138 does not have access to the client's password or ticket-granting ticket 144. This effectively limits the abilities of a restricted process 138 to those enforced by the authentication code in the operating system 142.

In addition, the present invention may be utilized in a Distributed Computing Environment (DCE) implementation of Kerberos. When a server acting on behalf of a client connects to a second server, both the original server's and the client's identity is sent. The second server can then make access control decisions based on both sets of identities. If there are more than two servers, then the identity of the other intervening servers is also sent.

Lastly, as can be readily appreciated, the present invention may be implemented with any other authentication protocol that enables additional information (i.e., restriction information) to be passed between a client and server along with the authentication credentials.

As can be seen from the foregoing detailed description, there is provided an improved security model that enables a process to launch another process in a restricted context that is a subset of its own rights and privileges. To this end, restricted tokens are created from a parent token which include security IDs that deny access rather than grant access relative to the parent token, remove privileges relative to the parent token and/or add restricted security IDs relative to the parent token. If restricted security IDs are added, a kernel mode security mechanism requires that both the user/group-based access check and the restricted security ID access check against a resource's access control list result in allowable access for the desired action, before access is granted to the resource.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system including a first process having access to a resource, a method of granting or denying access of a second process to the resource, comprising, creating a restricted access token from a parent token associated with a first process, the restricted access token having privilege and security identifier access rights therein that comprise reduced access rights relative to the parent token, associating the restricted access token with the second process, requesting that the second process be given access to the resource, providing a security descriptor associated with the resource to a security mechanism, providing the restricted token to the security mechanism, performing an access evaluation at the security mechanism by comparing information in the restricted token with information in the security descriptor, and determining whether to grant or deny access based on the result of the access evaluation.

2. The method of claim 1 wherein creating a restricted access token from a parent token includes removing at least one privilege from the restricted token relative to the parent token.

3. The method of claim 1 wherein creating a restricted access token from a parent token includes changing attribute information of a security identifier in the restricted token to reduce or deny access via that security identifier, relative to attribute information of a corresponding security identifier in the parent token.

4. The method of claim 3 wherein performing the access evaluation at the security mechanism includes, performing a first access check using user-based security identifier information in the restricted token and security identifier entries in the security descriptor, and if a correspondence is detected between a security identifier entry in the security descriptor and a user-based security identifier in the restricted token having attribute information that denies access, denying the process access to the resource.

5. The method of claim 1 wherein creating a restricted access token from a parent token includes adding a restricted security identifier to the restricted token.

6. The method of claim 5 wherein performing the access evaluation at the security mechanism includes performing a first access check using user-based security identifier information in the restricted token and security identifier entries in the security descriptor, and if the first access check indicates that access is allowable, performing a second access check using restricted security identifier information in the restricted token and security identifier entries in the security descriptor, and granting access if the second access check indicates that access is allowable.

7. The method of claim 6 wherein if performing the first access check indicates that access is not allowable, denying the second process access to the resource.

8. The method of claim 1 wherein creating a restricted access token includes copying the identifiers and privileges from the parent token into the restricted token, removing at least one privilege from the restricted token, changing attribute information of at least one security identifier in the restricted token to reduce or deny access, and adding at least one restricted security identifier to the restricted token.

9. The method of claim 1 wherein performing the access evaluation includes matching at least one security identifier in the restricted token with at least one security identifier in the security descriptor.

10. The method of claim 1 wherein performing the access evaluation further includes matching a type of action desired by the second process against an allowed type of action identified in the security descriptor.

11. The method of claim 1 wherein performing the access evaluation includes evaluating privileges in the restricted access token.

12. The method of claim 1 further comprising auditing the result of the access evaluation.

13. The method of claim 1 wherein creating a restricted access token from a parent token includes adding a plurality of sets of restricted security identifiers to the restricted token, and wherein performing the access evaluation at the security mechanism includes performing access checks on the sets of restricted security identifiers to obtain a plurality of results, and combining the results via a Boolean expression to determine whether to grant or deny access.

14. A computer-readable medium having computer-executable instructions for performing the method of claim 1.

15. In a computer system, a method of granting a process access to a resource, comprising, creating an access token and associating the token with the process requesting the access, the access token including user and group security identifiers and at least one restricted identifier corresponding to a process or resource, assigning an access control list to a resource, the access control list containing entries of identifiers having access to the resource, performing a first comparison of the user and group identifiers in the token with the entries in the access control list, and if the first comparison indicates that access is allowable, performing a second comparison of the at least one restricted identifier with the entries in the access control list, and granting access if the second comparison indicates that access is allowable.

16. The method of claim 15 wherein the access control list includes at least one allowable type of action with each entry, further comprising indicating a desired type of action to the security mechanism, and wherein performing the first and second comparisons each include comparing the desired type of action with the allowable type of action.

17. The method of claim 15 further comprising denying access before performing the second comparison if the first comparison indicates that access is not allowable.

18. A computer-readable medium having computer-executable instructions for performing the method of claim 14.

19. In a computer system, a system for providing access control, comprising, a process, a token associated with the process, the token including a list comprising at least one restricted security identifier therein, a resource, an access list associated with the resource comprising security identifier entries therein, and a security mechanism for performing an access evaluation by comparing the at least one identifier in the token list with the identifiers in the access list for granting or denying the process access to the resource based on a result of the access evaluation.

20. The system of claim 19 wherein the token further includes security identifiers therein identifying user and group information, and wherein the security mechanism performs the access evaluation including a first access check comparing user and group identifiers against identifiers in the access list and a second access check comparing the at least one restricted security identifier in the token list with the identifiers in the access list for granting or denying the process access to the resource based on a result of the first and second access checks.

21. The system of claim 20 wherein the security mechanism grants access when both the first access check determines that a security identifier representing a user or group in the token corresponds to a security identifier in the access control list, and the second access check determines that a security identifier in the token corresponds to a security identifier in the access control list, and wherein otherwise the security mechanism denies access.

22. The system of claim 19 wherein the token further includes user and group security identifiers therein identifying user and group information, and wherein the user and group security identifiers each include attribute information indicating whether that security identifier will be used for granting or denying access.

23. The method of claim 22 wherein the security mechanism denies access when the first access check determines that a user or group security identifier having an attribute indicating that the security identifier is used for denying access corresponds to a security identifier in the access control list.

24. The system of claim 19 wherein the security mechanism further evaluates privileges in the restricted access token.

25. A computer-readable medium having stored thereon a data structure associated with a process, comprising:
   a first data field including data representing user and group identifiers; and
   a second data field including data representing at least one other identifier;
   wherein the process is granted access to a resource if at least one identifier in the first data field and at least one identifier in the second data field each allowably match an entry in a list of identifier entries associated with the resource.

26. In a computer system, a method of determining access to system resources for a plurality of processes organized into a job, comprising, creating a restricted access token from a parent token, the restricted access token having privilege and security identifier access rights therein that comprise a reduced subset of privilege and security identifier access rights in the parent token, associating the restricted access token with the processes in the job, and for each process in the job, requesting access to a system resource, providing a security descriptor associated with that resource to a security mechanism, providing the restricted token to the security mechanism, performing an access evaluation at the security mechanism by comparing information in the restricted token with information in the security descriptor, and determining whether to grant or deny access for each process based on the result of the access evaluation.

27. The method of claim 26 further comprising producing another process in the job and associating the restricted token with that process.

28. In a computer network including a client machine and a server machine, a method of determining access to a server resource of a server process run for a client on the server machine, comprising, passing authentication information and restriction information from the client to the server, authenticating the client at the server based on the authentication information passed thereto, creating a restricted token on the server based on the restriction information passed thereto, the restricted token providing reduced access relative to a parent access token, associating the restricted token with the server process, requesting to access the server resource by the server process, and comparing the restricted token and a security descriptor of the resource to determine whether to grant or deny the process access to the resource.

29. The method of claim 28 wherein passing the authentication information and the restriction information from the client to the server includes, providing restriction data associated with a client process in a ticket request, passing the ticket request to a ticket issuing facility of the network for an authentication ticket, and in response to the request, receiving an authentication ticket at the client, the ticket including the restriction information therein.

30. The method of claim 29 wherein the ticket issuing facility is a key distribution center in accordance with the Kerberos authentication protocol.

31. A computer-readable medium having computer-executable instructions for performing the method of claim 28.

32. A computer-implemented method, comprising:
   deriving a restricted access token from a parent access token, the restricted access token having reduced access relative to the parent access token;
   associating the restricted access token with a process capable of requesting access to a set of resources; and
   providing the restricted access token to a security mechanism upon a request to access a resource of the set by the process, the security mechanism determining access to the resource based on the restricted access token and security information associated with the resource.

33. The method of claim 32 wherein deriving a restricted access token from a parent access token includes removing at least one privilege from the restricted token relative to the parent token.

34. The method of claim 32 wherein deriving a restricted access token from a parent access token includes changing attribute information of a security identifier in the restricted token.

35. The method of claim 32 wherein deriving a restricted access token from a parent access token includes adding a restricted security identifier to the restricted token.

36. The method of claim 35 wherein the restricted security identifier identifies an application program.

37. The method of claim 32 wherein the security mechanism is incorporated into an operating system.

38. A computer-readable medium having computer-executable instructions for performing the method of claim 32.

* * * * *